(12) United States Patent
Worman, Jr.

(10) Patent No.: US 9,423,014 B2
(45) Date of Patent: Aug. 23, 2016

(54) DIFFERENTIAL ASSEMBLY WITH C-LOCK KEEPER

(71) Applicant: American Axle & Manufacturing, Inc., Detroit, MI (US)

(72) Inventor: William E. Worman, Jr., Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 133 days.

(21) Appl. No.: 14/510,555

(22) Filed: Oct. 9, 2014

(65) Prior Publication Data

US 2016/0102747 A1    Apr. 14, 2016

(51) Int. Cl.
*F16H 48/38* (2012.01)
*F16H 48/08* (2006.01)
*F16H 48/40* (2012.01)

(52) U.S. Cl.
CPC ............... *F16H 48/38* (2013.01); *F16H 48/08* (2013.01); *F16H 48/40* (2013.01)

(58) Field of Classification Search
CPC .......... F16H 48/08; F16H 48/38; F16H 48/40
See application file for complete search history.

(56) References Cited

U.S. PATENT DOCUMENTS

| 3,400,611 | A  | * | 9/1968  | Engle    | F16H 48/08 475/235 |
| 3,624,717 | A  | * | 11/1971 | Brubaker | F16H 48/08 403/350 |
| 6,254,505 | B1 | * | 7/2001  | Forrest  | F16H 48/08 475/150 |
| 7,232,397 | B2 | * | 6/2007  | Valente  | F16H 48/285 475/220 |
| 2007/0191170 | A1 | * | 8/2007 | Valente | F16H 48/11 475/220 |
| 2010/0255948 | A1 |   | 10/2010 | Hewins et al. | |

* cited by examiner

*Primary Examiner* — Jacob S Scott
(74) *Attorney, Agent, or Firm* — Harness, Dickey & Pierce, P.L.C.

(57) ABSTRACT

The present teachings provide for a differential assembly including a pair of plates and a keeper. A pair of pinion gears can be rotatable within a case for common rotation about a first axis and relative rotation about a second axis. A pair of side gears can meshingly engage the pinion gears, each being coupled for rotation with an output shaft. Each plate can be received in a groove defined by a respective output shaft, and can have a radial width greater than a depth of the groove. The keeper can be axially between the pinion and side gears, and can include releasably coupled first and second bodies, that cooperate to define first and second bores. Each bore can define an inner surface that surrounds a respective one of the plates to prevent its escape from the groove.

20 Claims, 4 Drawing Sheets

DIFFERENTIAL ASSEMBLY WITH C-LOCK KEEPER

FIELD

The present disclosure relates to a differential assembly with a C-lock keeper.

BACKGROUND

This section provides background information related to the present disclosure which is not necessarily prior art.

Some conventional axle assemblies, such as semi-float beam axles for example, include a differential assembly configured to receive torque via an input and transmit differential output torques to left and right axle shafts. The differential typically includes a casing, a pair of pinion gears, and a pair of side gears. The pinion gears are mounted on a cross-pin shaft within the casing for common rotation with the casing about a first axis and relative rotation about the cross-pin's axis. The side gears are rotatably mounted within the casing and meshingly engaged with the pinion gears. Each of the side gears is non-rotatably coupled to a respective one of the axle shafts to provide differential torque to each axle shaft. Each side gear typically has an internally splined bore that is counter-bored on a side of the gear facing the cross-pin. Each axle shaft typically has an externally splined surface and a circumferentially extending groove on an end of the axle shaft facing the cross-pin. The internally and externally splined surfaces are configured to couple the side gear and the axle shaft for common rotation. A "C" shaped plate, typically called a C-lock, or retainer, is configured to fit around the circumferentially extending groove in each axle shaft to inhibit outboard relative axial movement between the side gear and the axle shaft. When the differential is assembled, the C-lock fits within the counter-bore of the side gear to prevent the C-lock from escaping the circumferential groove. The axle shafts with engaged C-locks are blocked from inboard relative axial movement with the side gear by the presence of the cross-pin. Typically the cross-pin must be removed partially from the differential casing to enable assembly/disassembly of the C-locks to the axle shafts. Because the cross-pin removal must clear the teeth of the hypoid ring gear externally mounted to the differential casing, the differential casing must be designed with enough length along its primary axis to allow the aforementioned assembly/disassembly process. This condition contributes to higher mass and cost of the axle assembly. To this end, there remains a need in the art for development of improved differential assemblies.

SUMMARY

This section provides a general summary of the disclosure, and is not a comprehensive disclosure of its full scope or all of its features.

The present teachings provide for a differential assembly including a case, a pair of pinion gears, a pair of output shafts, a pair of side gears, a pair of plates and a keeper. The case can be adopted to be supported within an axle housing for rotation about a first axis. The case can define a cavity. Each pinion gear can be received in the cavity and rotatable relative to the case about a second axis that can be perpendicular to the first axis. Each side gear can be received in the cavity and rotatable about the first axis. Each side gear can be meshingly engaged with the pair of pinion gears. Each output shaft can be coupled for rotation with a respective one of the side gears. Each output shaft can have an outer surface that defines a circumferentially extending groove. Each plate can be received in the groove of a respective one of the output shafts. Each plate can have a maximum radial width that is greater than a depth of the groove. The keeper can be disposed axially between each pinion gear and axially between each side gear. The keeper can include a first body and a second body that can be releasably coupled to the first body. The first and second bodies can cooperate to define a first bore and a second bore. Each of the first and second bores can define an inner radial surface. Each inner radial surface can be disposed about the first axis and can surround a respective one of the plates to inhibit escape of the respective plate from the groove of the respective output shaft.

The present teachings further provide for a differential assembly including a case, a cross-pin, a pair of pinion gears, a pair of output members, a pair of side gears, a pair of lock members and a keeper. The case can be adapted to be supported within an axle housing for rotation about a first axis. The case can define a cavity. The cross-pin can be received in the cavity and coupled to the case for common rotation about the first axis. The pair of pinion gears can be received in the cavity and rotatably coupled to the cross-pin for rotation relative to the case about a second axis that can be perpendicular to the first axis. Each side gear can be received in the cavity and rotatable about the first axis. Each side gear can be meshingly engaged with the pair of pinion gears. Each output member can be coupled for rotation with a respective one of the side gears. Each output member can have an outer surface that defines a circumferentially extending channel. Each lock member can be received in the channel of a respective one of the output members. Each lock member can have a maximum radial width that is greater than a depth of the channel. The keeper can be disposed about the cross-pin and can include a first body and a second body that can be releasably coupled to the first body. The first and second bodies can define a pair of walls. Each wall can define an inner surface that surrounds a resepective one of the lock members. Each outer surface of the respective output member and the inner surface of each wall can be radially spaced apart by a distance that is less than the maximum radial width of each lock member.

The present teachings further provide for a differential assembly including a case, a cross-pin, a pair of pinion gears, a pair of output members, a pair of side gears, a pair of lock members, and a keeper. The case can be adapted to be supported within an axle housing for rotation about a first axis. The case can define a cavity. The cross-pin can be received in the cavity and coupled to the case for common rotation about the first axis. The pair of pinion gears can be received in the cavity and rotatably coupled to the cross-pin for rotation relative to the case about a second axis that can be perpendicular to the first axis. Each side gear can be received in the cavity and rotatable about the first axis. Each side gear can be meshingly engaged with the pair of pinion gears. Each output member can be coupled for rotation with a respective one of the side gears. Each output member can have an outer surface that defines a circumferentially extending groove. Each lock member can be received in the groove of a respective one of the output members. Each lock member can have a maximum radial width that is greater than a depth of the groove. The keeper can be disposed about the cross-pin. The keeper can include a first body and a second body releasably coupled to the first body. A first side of the keeper can define a first annular cavity. A second side of the keeper can define a second annular cavity. The first and second annular cavities can be concentric with the pair of output members. Each of the first and second annular cavities can define an inner radial surface that surrounds a respective one of the lock members. Each outer surface of the respective output member and the inner radial surface of the first and second annular cavities can be spaced apart by a distance that is less than the maximum radial width of each lock member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and do not represent all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
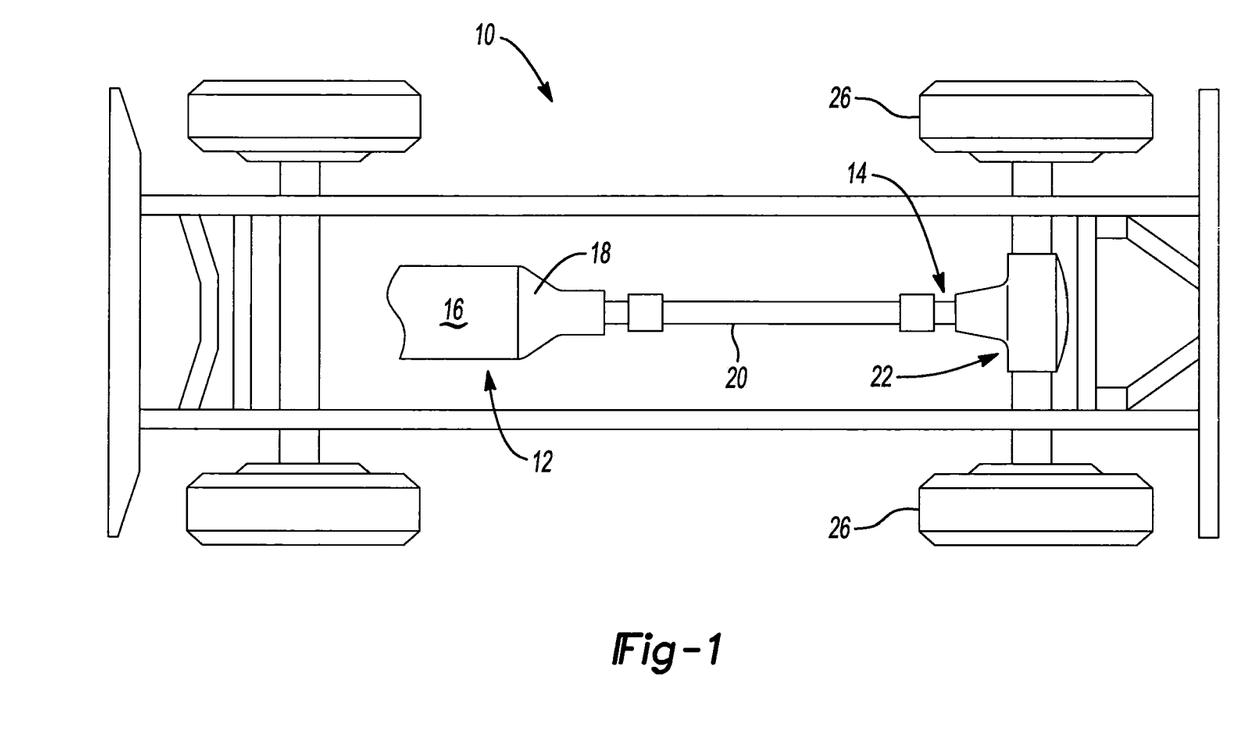
FIG. 1 is a schematic illustration of a vehicle having an example of an axle assembly (e.g., rear axle assembly) constructed in accordance with the teachings of the present disclosure.

With reference to FIG. 1 of the drawings, a vehicle having an example of an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a propshaft 20 and a rear axle assembly 22. The propshaft 20 can couple the transmission 18 to the rear axle assembly 22 such that rotary power output of the transmission 18 can be received by the rear axle assembly 22. The rear axle assembly 22 can distribute the rotary power to the rear vehicle wheels 26.

Figure 2:
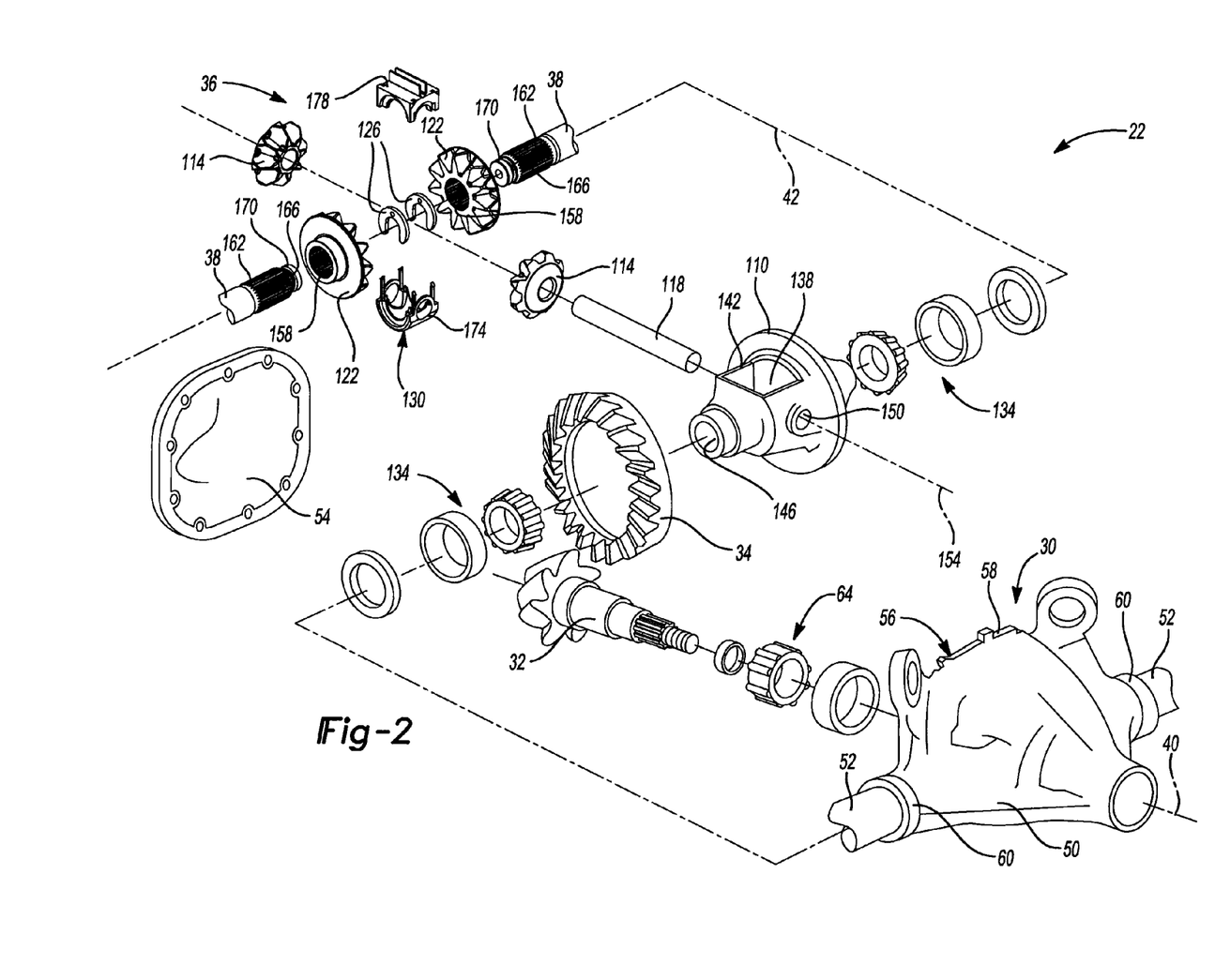
FIG. 2 is an exploded perspective view of a portion of the vehicle of FIG. 1 illustrating the rear axle assembly in more detail including a differential assembly having a C-lock keeper in accordance with the present disclosure.

With reference to FIG. 2, the rear axle assembly 22 can include a housing 30, an input pinion gear 32, a ring gear 34, a differential assembly 36, and a pair of output shafts 38. The input pinion gear 32 can be rotatable about a first axis 40, while the ring gear 34 and the differential assembly 36 can be rotatable about a second axis 42 that can be transverse (e.g., perpendicular) to the first axis 40 when the rear axle assembly 22 is assembled.

The housing 30 can comprise a carrier housing 50, a pair of axle tubes 52 and a cover 54. The carrier housing 50 can define a central chamber 56, a cover flange 58, and a pair of tube mounts 60. Each of the axle tubes 52 can be received into a corresponding one of the tube mounts 60 and fixedly coupled to the carrier housing 50. For example, each axle tube 52 can be press-fit into a respective one of the tube mounts 60 and one or more conventional slug welds (not specifically shown) can be employed to axially and rotationally secure each axle tube 52 to its tube mount 60. The cover 54 can be mounted to the cover flange 58 to close the access to the central chamber 56. A gasket (not shown) can be disposed between the cover 54 and the cover flange 58.

The input pinion gear 32 can be received in the central chamber 56 and mounted on a set of pinion bearings 64 (only one shown) for rotation about the first axis 40. The pinion bearings 64 can be any suitable type of bearing, such as angular contact ball bearings and/or low friction tapered bearings. A pinion flange (not shown) can be mounted onto the input pinion gear 32 and can be coupled to the input pinion gear 32 and the propshaft 20 (FIG. 1) to transmit rotational power therebetween.

The differential assembly 36 can include a differential case 110, a pair of differential pinion gears 114, a cross-pin 118, a pair of side gears 122, a pair of C-locks 126, and a C-lock keeper assembly 130. The differential case 110 can be received in the central chamber 56 and can be mounted on a set of differential bearings 134 for rotation about the second axis 42. The differential bearings 134 can be angular contact ball bearings or low friction tapered bearings for example. The ring gear 34 can be fixedly coupled to the differential case 110 and meshingly engaged to the input pinion gear 32. In the particular example provided, the ring gear 34 is welded (e.g., laser welded) to the differential case 110, but other coupling means, such as threaded fasteners, could be employed in the alternative. The input pinion gear 32 and the ring gear 34 can be configured as a hypoid bevel gearset. The differential case 110 can define a differential cavity 138 that can be open to the exterior of the differential case 110 by a differential window 142. Each of the output shafts 38 can be received through a respective one of a pair of apertures 146 (only one shown), that can be disposed on opposite sides of the differential case 110, such that the output shafts 38 can be partially received in the differential cavity 138. In the example provided, each output shaft 38 is an axle shaft coupled for common rotation with a respective one of the wheels 26 (FIG. 1), though those of skill in the art will appreciate that additional drivetrain components, such as clutches or other shafts for example, can be disposed between one or both of the output shafts 38 and the wheels 26.

The cross-pin 118 can be mounted to the differential case 110 such that the cross-pin 118 traverses the differential cavity 138 in an orientation that is transverse to the second axis 42. The cross-pin 118 can be fixedly mounted to the differential case 110 and can be received through a pair of apertures 150 (only one shown) defined by the differential case 110. The pair of pinion gears 114 can be mounted within the differential cavity 138 about the cross-pin 118 for rotation relative to the differential case 110. The pinion gears 114 can be rotatable relative to the cross-pin 118 and differential case 110 about a third axis 154 that is transverse (e.g. perpendicular) to the second axis 42.

The side gears 122 can be mounted within the differential cavity 138 for rotation relative to the differential case 110, and each side gear 122 can be meshingly engaged with both of the pinion gears 114. Each of the side gears 122 can be non-rotatably coupled to a respective one of the output shafts 38 for common rotation therewith. In the example provided, each side gear 122 has an internally splined bore 158 and each output shaft 38 has an externally splined surface 162 configured to matingly engage the internally splined bore 158. In this way, when one of the side gears 122 is received in the differential cavity 138 and its corresponding output shaft 38 is inserted through the corresponding aperture 146, the output shaft 38 can be received through the internally splined bore 158 of the side gear 122 and the internal and external splines 158, 162 can mate to couple the side gear 122 and the output shaft 38 for common rotation about the second axis 42.

Figure 5:
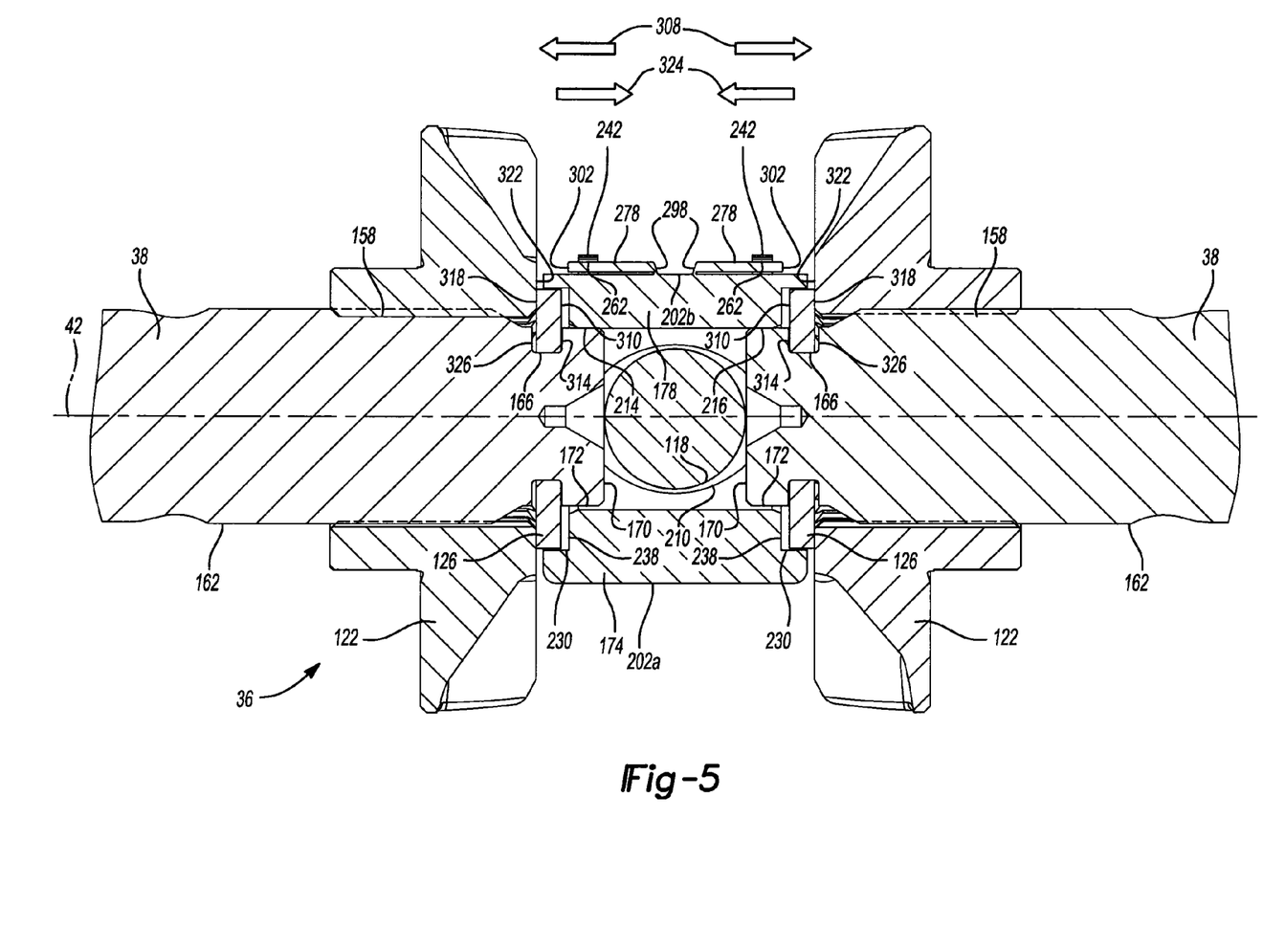
FIG. 5 is a sectional view of the portion of the differential assembly of FIG. 4 taken along line 5-5.

A circumferential channel or groove 166 can be defined by an outer radial surface 172 of each output shaft 38 that is proximate to an end 170 of each output shaft 38. The circumferential groove 166 can extend radially inward from the outer radial surface 172, and can extend circumferentially about the output shaft 38. When the output shaft 38 and the side gear 122 are matingly engaged within the differential cavity 138, the end 170 of the output shaft 38 and the circumferential groove 166 can protrude from the side gear 122 to be disposed axially between the side gear 122 and the cross-pin 118. Each C-lock 126 can be a generally "C" or "U" shaped plate configured to surround a portion of the output shaft 38 proximate to the end 170 to fit within the circumferential groove 166 and extend radially outward from the circumferential groove 166, as best shown in FIG. 5. When the differential assembly 36 is assembled, the C-locks 126 inhibit relative axial movement between the output shafts 38 and the side gears 122 to retain the output shafts 38 axially within the side gears 122 and retain the output shafts 38 within the differential cavity 138 as described below.

Figure 3:
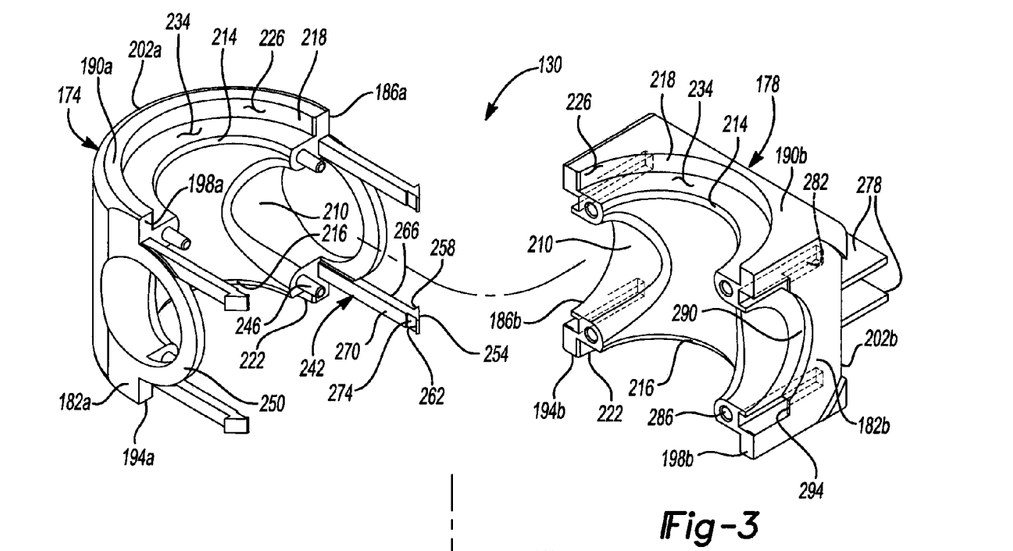
FIG. 3 is an exploded perspective view of the C-lock keeper of FIG. 2.
Figure 4:
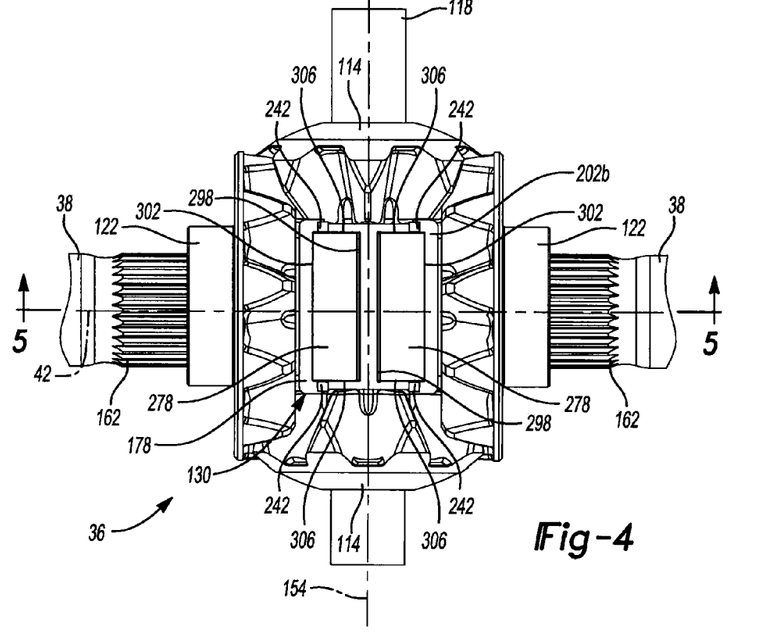
FIG. 4 is a side elevated view of a portion of the differential assembly of FIG. 2.

With additional reference to FIGS. 3-5, the C-lock keeper assembly 130 can include a first body 174 and a second body 178. In the example provided, the first body 174 is a male body and the second body 178 is its female counterpart, though other configurations can be used. In the example provided, the male and female bodies 174, 178 are each formed from a molded material, such as glass filled plastic for example, though other materials can be used. The male and female bodies 174, 178 can generally each have a first side 182a, 182b, a second side 186a, 186b, a third side 190a, 190b, a fourth side 194a, 194b, a fifth side 198a, 198b, and a sixth side 202a, 202b. The male and female bodies 174, 178 can be configured to interlock about the cross-pin 118, such that the C-lock keeper assembly 130 can be disposed axially between each of the side gears 122 and axially between each of the pinion gears 114, as best shown in FIGS. 4 and 5. When interlocked, the corresponding first, second, third, and fourth sides 182a, 186a, 190a, 194a of the male body 174 generally align with the first, second, third, and fourth sides 182b, 186b, 190b, 194b of the female body 178, while the fifth sides 198a, 198b generally oppose each other and the sixth sides 202a, 202b are generally spaced apart by the rest of the male and female bodies 174, 178.

When interlocked, the male and female bodies 174, 178 can define a cross-pin bore 210, an output shaft bore 214, a second output shaft bore 216, and a pair of counter-bores 218, 222. The cross-pin bore 210 can penetrate through the first and second sides 182a, 182b, 186a, 186b of the male and female bodies 174, 178. The first output shaft bore 214 can be perpendicular to the cross-pin bore 210 and can penetrate through the third sides 190a, 190b of the male and female bodies 174, 178. The second output shaft bore 216 can be perpendicular to the cross-pin bore 210 and can penetrate through the fourth sides 194a, 194b of the male and female bodies 174, 178, and can be similar to the first output shaft bore 214. The first and second output shaft bores 214, 216 can extend through the C-lock keeper assembly 130 to meet within the C-lock keeper assembly 130 such that the cross-pin bore 210 and output shaft bores 214, 216 can intersect within the C-lock keeper assembly 130. When the differential assembly 36 is assembled, the cross-pin bore 210 can be configured to be aligned along the third axis 154 such that the C-lock keeper assembly 130 surrounds the cross-pin 118 about the third axis 154. The output shaft bores 214, 216 can be configured to be aligned along the second axis 42 such that the C-lock keeper assembly 130 surrounds a portion of the ends 170 of each output shaft 38, including the circumferential groove 166.

Each of the counter-bores 218, 222 can be defined by the third sides 190a, 190b and the fourth sides 194a, 194b respectively. Each counter-bore 218, 222 can be concentric with the respective output shaft bore 214, 216 and has a diameter greater than the diameter of the output shaft bore 214, 216 and slightly greater than the diameter of the C-locks 126. Each counter-bore 218, 222 extends inward from the exterior of the C-lock keeper assembly 130 a distance such that the counter-bore 218, 222 does not intersect with the cross-pin bore 210. Each of the counter-bores 218, 222 can define an inner radial surface 226, 230, and an inner axial surface 234, 238. The radial distance between the inner radial surface 226, 230 and the outer radial surface 172 of the output shaft 38 can be less than the radial width of the C-locks 126 such that the C-locks 126 cannot escape the circumferential groove 166 when the C-lock keeper assembly 130 is assembled about the C-locks 126 and the end 170.

The male body 174 can include a plurality of prongs or barbs 242 and a plurality of pins 246. The barbs 242 can extend outward from the fifth side 198a of the male body 174 generally toward the female body 178. In the example provided, the fifth sides 198a, 198b generally bisect the shaft bores 214, 216 and the cross-pin bore 210, such that the male and female bodies 174, 178 form opposite halves of the C-lock keeper assembly 130, though other configurations or proportions can be used. A portion of the first and second sides 186a, 186b of the male body 174 can also optionally extend beyond the fifth side 198a to form a pair of rings 250 which can surround the entire cross-pin bore 210 when the male and female bodies 174, 178 are mated. When the C-lock keeper assembly 130 includes the rings 250 and the differential assembly 36 is assembled, the rings 250 can completely surround the cross-pin 118 to retain the male body 174 about the cross-pin 118 when the female body 178 is not mated to the male body 174. In the example provided, the male body 174 includes four generally rectangularly shaped barbs 242 that extend from four corners of the fifth side 198a, such that adjacent barbs 242 are spaced apart from one another by either the cross-pin bore 210 or the output shaft bores 214, 216.

Each barb 242 can include a ramped surface 254, a first shoulder 258, and a second shoulder 262. The first and second shoulders 258, 262 can be disposed on different sides of each barb 242. The ramped surface 254 can begin proximate to a terminal end of the barb 242 and terminate at the first shoulder 258. In the example provided, the first shoulder 258 of each barb 242 is disposed on an exterior side 266 of the barb 242 (i.e. the side away from the output shaft bore 214, 216), and the second shoulder 262 is disposed on an interior side 270 of the barb 242 (i.e. the side facing toward the output shaft bore

214, 216), though other configurations can be used. In the example provided, the second shoulder 262 forms a wall of a channel 274 defined by the interior side 270 of the barb 242.

The pins 246 can extend generally parallel to the barbs 242 outward from the fifth side 198*a* of the male body 174. In the example provided, the male body 174 includes four pins 246, with each pin 246 being located adjacent to one of the four barbs 242 at a respective corner of the fifth side 198*a*. In the example provided, each pin 246 is located radially inward of its respective barb 242 relative to the output shaft bore 214, 216 and is radially aligned with each of the barbs 242 relative to the pin bore 210, though other configurations can be used. In the example provided, each pin 246 is a generally cylindrical shape, though other configurations can be used.

The fifth side 198*b* of the female body 178 can be configured to mate with the fifth side 198*a* of the male body 174, and the female body 178 can include a pair of tabs 278 and can define a plurality of passages 282 and a plurality of holes 286. Each of the first and second sides 186*a*, 186*b* of the female body 178 can also define a recess 290. The number of passages 282 and holes 286 can be equal to the respective number of barbs 242 and pins 246 on the male body 174, and in the example provided, the female body 178 includes four passages 282 and four holes 286.

The passages 282 can extend through the female body 178 from the fifth side 198*b* to the sixth side 202*b* of the female body 178. Each passage 282 can be shaped to receive a respective one of the barbs 242 therein, such that when the male and female bodies 174, 178 are mated, the barbs 242 extend through the female body 178 via the passages 282. When the male and female bodies 174, 178 are fully mated, the first and second shoulders 258, 262 can be disposed outside of the passages 282 and beyond the sixth side 202*b* of the female body 178. Each passage 282 and barb 242 can be configured such that when the barb 242 is inserted into the passage 282 during mating, the ramped surface 254 can engage an outer surface 294 of the passage 282 to articulate the barb 242 inward. The barb 242 can be formed of a material having a resiliency such that when the male and female bodies 174, 178 are fully mated, and the first shoulder 258 can be disposed outside the passage 282, the barb 242 can be biased toward its original alignment to cause the first shoulder 258 to engage the sixth side 202*b* of the female body 178. In this position, the first shoulder 258 can inhibit separation of the male and female bodies 174, 178. While described herein with respect to the barbs 242, the first and second bodies 174, 178 can alternatively be coupled together by other fastening means, such as threaded fasteners (not shown), or an adhesive (not shown) for example.

Each hole 286 can be aligned with a respective one of the pins 246 such that when the male and female bodies 174, 178 are mated, each pin 246 can be received in a respective one of the holes 286. The recesses 290 can extend inward from the exteriors of the first and second sides 186*a*, 186*b* of the female body 178 and can surround the portion of the cross-pin bore 210 that is defined by the female body 178. The recesses 290 can have a shape complimentary to the rings 250 of the male body 174, such that the rings 250 can be received in the recesses 290 when the male and female bodies 174, 178 are mated. In the example provided, the recesses 290 are generally annularly shaped and concentric with the cross-pin bore 210.

Each of the tabs 278 can be generally rectangular in shape and have a first end 298, a second end 302, and a pair of side 306. The first end 298 can be coupled to the sixth side 202*b* of the female body 178. The first end 298 can be coupled to the sixth side 202*b* such that the tab 278 can be pivoted or bent from a first position (shown in FIGS. 2 and 3) to a second position (shown in FIGS. 4 and 5). In the example provided, the first end 298 of each tab 278 is a longitudinal side of the rectangular tab 278, and is disposed lengthwise along the sixth side 202*b* such that the first end 298 is generally parallel to the third axis 154, though other configurations can be used. In the example provided, the second end 302 is an opposite longitudinal side of the rectangular tab 278 and each of the side 306 form opposite short sides of the rectangular tab 278, though other configurations can be used. The tabs 278 can be unitarily formed with the female body 178 (e.g. integrally molded with the female body 178) in the first position, such that their natural position is the first position. The tabs 278 can be formed of a resilient material, such that when the tabs 278 are bent into the second position, the tabs 278 are naturally biased toward the first position. While the tabs 278 are shown formed at 90° angles relative to the sixth side 202*b*, the tabs 278 can alternatively be formed at other angles greater than 0°, such as 45° for example, such that the tabs 278 can still be naturally biased toward the first position when moved to the second position.

The tabs 278 can be a thickness less than a width of the channels 274. The tabs 278 can be a length, such that when the male and female bodies 174, 178 are mated, the tabs 278 can be moved from the first position to the second position to position each of the sides 306 within the channel 274 of one of the barbs 242. In this way, each tab 278 can engage the channels 274 of two barbs 242 to further inhibit separation of the male and female bodies 174, 178. The tabs 278 can be configured such that when the tab 278 is received in the channel 274, the side 306 can engage the second shoulder 262 to inhibit axial removal of the barb 242. Furthermore, the tabs 278 can be configured such that when the tab 278 is received in the channel 274, the side 306 can position the first shoulder 258 to interfere or overlap with the sixth side 202*b* of the female body 178. In this way, the tab 278 can inhibit bending or articulating of the barb 242, such that when the tab 278 is received in the channel 274, the tab 278 can block the first shoulder 258 from being moved to a position where the first shoulder 258 could enter the passage 282.

With specific reference to FIG. 5, a sectional view of a portion of the differential assembly 36 is shown as assembled and cut along line 5-5 of FIG. 4. As described above, each C-lock 126 can be located about a respective output shaft 38 and received within the circumferential groove 166 formed in the end 170 of the output shaft 38. Axial movement of the output shaft 38 away from the cross-pin 118 (i.e. in an outward direction 308) can cause an inner surface 310 of the C-lock 126 to abut against an inner surface 314 of the circumferential channel 274, and an outer surface 318 of the C-lock 126 to abut against an inner surface 322 of the side gear 122. Axial movement of the output shaft 38 toward the cross-pin 118 (i.e. in an inward direction 324) can be limited by contact between the output shaft 38 and the cross-pin 118 as shown.

Alternatively, axial movement of the output shaft 38 toward the cross-pin 118 (i.e. in the inward direction 324) can cause the inner surface 310 of the C-lock 126 to abut against the inner axial surface 234, 238 of the counter-bore 218, 222, and the outer surface 318 of the C-lock 126 to abut against an outer surface 326 of the circumferential groove 166. In yet another configuration, not specifically shown, the first output shaft bore 214 and the second output shaft bore 216 can terminate axially before the cross-pin bore 210, such that the first and second output shaft bores 214, 216 do not meet within the C-lock keeper assembly 130. In such a configuration, each output shaft bore 214, 216 can define a step or surface (not shown) on which each respective end 170 of the output shafts 38 can abut. In such a configuration, the step or surface defined by the output shaft bore 214, 216 can be axially between the output shaft 38 and the cross-pin 118 such that the step or surface limits axial movement toward the cross-pin 118 and prevents the output shaft 38 from contacting the cross-pin 118.

The inner radial surface 226, 230 of the counter-bore 218, 222 of the C-lock keeper assembly 130 can radially constrain the C-lock 126 to prevent the C-lock 126 from escaping the circumferential groove 166 as described above. The inner surface 322 of the side gear 122 can be the innermost surface of the side gear 122, such that no other surface of the side gear 122 extends further inward toward the cross-pin 118 than the inner surface 322. In other words, the C-lock 126 need not be received in any bore formed in the side gear 122 and the side gear 122 does not radially constrain the C-lock 126 within the circumferential groove 166. Compared to traditional C-lock differential assemblies, which use a counter bore in surface 322 of the side gear 122 to radially constrain the C-lock 126, additional machining of the side gear 122 is eliminated and the axial length of the side gear 122 can be reduced.

Furthermore, it is appreciated that unlike traditional differential assemblies containing C-locks to retain output shafts, the differential assembly 36 of the present disclosure permits the C-locks 126 and output shafts 38 to be installed and removed without removing the cross-pin 118 or fully disassembling the differential assembly 36. Instead, either one, or both of the male and female bodies 174, 178 can be removed from a fully assembled differential assembly 36 through the differential window 142, which then allows the C-locks 126 to be installed or removed through the differential window 142 without removing the cross-pin 118. Furthermore, since the cross-pin 118 does not have to be removed in order to install or remove C-locks 126 and output shafts 38, the axial length of the differential assembly 36 between the cross-pin axis 154 and the case bearing 134 that is on the side of the case 110 having the ring gear 34 can be reduced, thus a more compact differential assembly 36 and axle assembly 22 can be made.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A differential assembly comprising:
   a case adapted to be supported within an axle housing for rotation about a first axis, the case defining a cavity;
   a pair of pinion gears received in the cavity and rotatable relative to the case about a second axis that is perpendicular to the first axis;
   a pair of side gears received in the cavity and rotatable about the first axis, each side gear being meshingly engaged with the pair of pinion gears;
   a pair of output shafts, each output shaft being coupled for rotation with a respective one of the side gears and having an outer surface that defines a circumferentially extending groove;

a pair of plates, each plate being received in the groove of a respective one of the output shafts, each plate having a maximum radial width that is greater than a depth of the groove; and a keeper received between the pinion gears and the side gears, the keeper including a first body and a second body coupled to the first body, the first and second bodies cooperating to define a first bore and a second bore, wherein each of the first and second bores define an inner radial surface, each inner radial surface being disposed about the first axis and surrounding a respective one of the plates to inhibit escape of the respective plate from the groove of the respective output shaft.

2. The differential assembly of claim 1, wherein each plate has a generally "C" or "U" shape.

3. The differential assembly of claim 1, wherein the first body includes at least one barb that extends through at least one passage defined by the second body, wherein the barb includes a first shoulder configured to engage a surface of the second body to inhibit axial separation of the first and second bodies and releasably couple the first and second bodies to each other.

4. The differential assembly of claim 3, wherein the barb defines a second shoulder, and the keeper includes at least one tab having a first end and a side, the first end of the tab coupling the tab to the second body, and the side of the tab being configured to engage the second shoulder to inhibit removal of the barb from the passage.

5. The differential assembly of claim 4, wherein the first body includes four barbs and the second body defines four passages, each barb being spaced apart from each other barb by either the first bore or the second bore, and each barb being received in a respective one of the passages; and wherein the keeper includes a plurality of the tabs, each tab being configured to engage the second shoulder of at least one barb to inhibit removal of the barb from the respective passage.

6. The differential assembly of claim 5, wherein the keeper includes two tabs, each tab being configured to engage the second shoulder of two of the barbs.

7. The differential assembly of claim 1, further comprising a cross-pin disposed about the second axis and coupled to the case for common rotation about the first axis, the pair of pinion gears being rotatably coupled to the cross-pin, and the keeper defining a second bore disposed about the cross-pin.

8. A differential assembly comprising:
a case adapted to be supported within an axle housing for rotation about a first axis, the case defining a cavity;
a cross-pin received in the cavity and coupled to the case for common rotation about the first axis;
a pair of pinion gears received in the cavity and rotatably coupled to the cross-pin for rotation relative to the case about a second axis that is perpendicular to the first axis;
a pair of side gears received in the cavity and rotatable about the first axis, each side gear being meshingly engaged with the pair of pinion gears;
a pair of output members, each output member being coupled for rotation with a respective one of the side gears and having an outer surface that defines a circumferentially extending channel;
a pair of lock members, each lock member being received in the channel of a respective one of the output members, each lock member having a maximum radial width that is greater than a depth of the channel; and
a keeper disposed about the cross-pin and including a first body and a second body coupled to the first body, wherein the first and second bodies define a pair of walls, each wall defining an inner surface that surrounds a respective one of the lock members;
wherein each outer surface of the respective output member and the inner surface of each wall are radially spaced apart by a distance that is less than the maximum radial width of each lock member.

9. The differential assembly of claim 8, wherein the lock members have a generally "C" or "U" shape.

10. The differential assembly of claim 8, wherein the first body includes at least one barb that extends through at least one passage defined by the second body, wherein the barb includes a first shoulder configured to engage a surface of the second body to inhibit axial separation of the first and second bodies and releasably couple the first and second bodies to each other.

11. The differential assembly of claim 10, wherein the barb defines a second shoulder, and the second body includes at least one tab having a first end and a side, the first end of the tab coupling the tab to the second body, and the side of the tab being configured to engage the second shoulder to inhibit removal of the barb from the passage.

12. The differential assembly of claim 11, wherein the first body includes four barbs and the second body defines four passages, each barb being spaced apart from each other barb by either the cross-pin or one of the output members, and each barb being received in a respective one of the passages; and wherein the second body includes a plurality of tabs, each tab being configured to engage the second shoulder of at least one barb to inhibit removal of the barb from the respective passage.

13. The differential assembly of claim 12, wherein the second body includes two tabs, each tab being configured to engage the second shoulder of two of the barbs.

14. A differential assembly comprising:
a case adapted to be supported within an axle housing for rotation about a first axis, the case defining a cavity;
a cross-pin received in the cavity and coupled to the case for common rotation about the first axis;
a pair of pinion gears received in the cavity and rotatably coupled to the cross-pin for rotation relative to the case about a second axis that is perpendicular to the first axis;
a pair of side gears received in the cavity and rotatable about the first axis, each side gear being meshingly engaged with the pair of pinion gears;
a pair of output members, each output member being coupled for rotation with a respective one of the side gears and having an outer surface that defines a circumferentially extending groove;
a pair of lock members, each lock member being received in the groove of a respective one of the output members, each lock member having a maximum radial width that is greater than a depth of the groove; and
a keeper disposed about the cross-pin, the keeper including a first body and a second body coupled to the first body, a first side of the keeper defining a first annular cavity, and a second side of the keeper defining a second annular cavity;
wherein the first and second annular cavities are concentric with the pair of output members and each of the first and second annular cavities defines an inner radial surface that surrounds a respective one of the lock members; and
wherein each outer surface of the respective output member and the inner radial surface of the first and second annular cavities are spaced apart by a distance that is less than the maximum radial width of each lock member.

15. The differential assembly of claim 14, wherein the lock member has a generally "C" or "U" shape.

16. The differential assembly of claim 14, wherein the first body includes at least one barb that extends through at least one passage defined by the second body, wherein the barb includes a first shoulder configured to engage a surface of the second body to inhibit axial separation of the first and second bodies and releasably couple the first and second bodies to each other.

17. The differential assembly of claim 16, wherein the barb defines a second shoulder, and the second body includes at least one tab having a first end and a side, the first end of the tab coupling the tab to the second body, and the side of the tab being configured to engage the second shoulder to inhibit removal of the barb from the passage.

18. The differential assembly of claim 17, wherein the first body includes four barbs and the second body defines four passages, each barb being spaced apart from each other barb by either the cross-pin or one of the output members, and each barb being received in a respective one of the passages; and
   wherein the second body includes a plurality of tabs, each tab being configured to engage the second shoulder of at least one barb to inhibit removal of the barb from the respective passage.

19. The differential assembly of claim 18, wherein the second body includes two tabs, each tab being configured to engage the second shoulder of two of the barbs.

20. The differential assembly of claim 16, wherein one of the first and second bodies includes at least one pin and the other of the first and second bodies includes at least one hole, each pin being received in one hole.

\* \* \* \* \*